Dec. 22, 1959     K. P. BAGNALL     2,918,030
SHIP SALVAGE APPARATUS
Filed Feb. 28, 1957     2 Sheets-Sheet 1
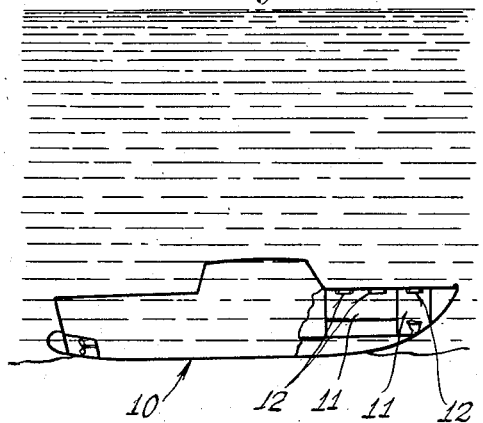
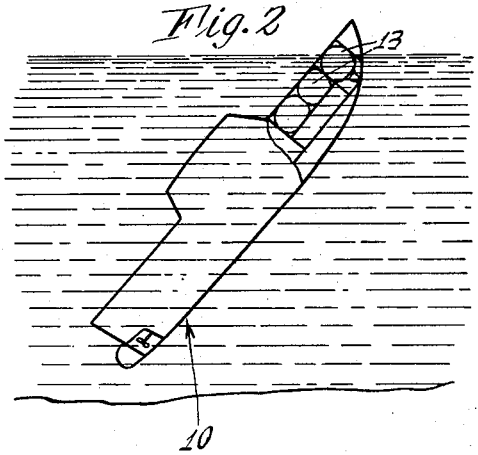
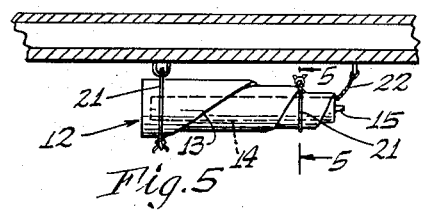
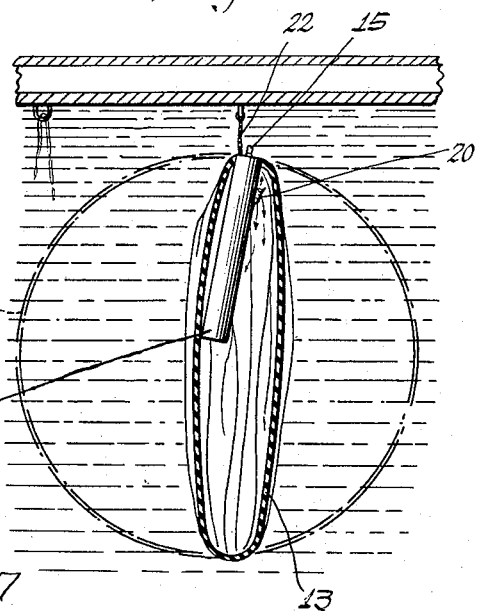
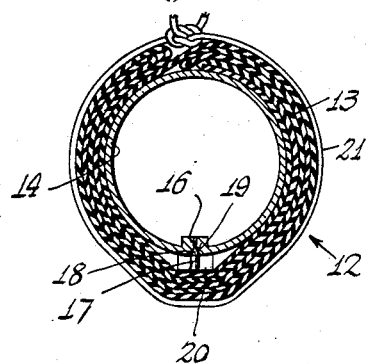
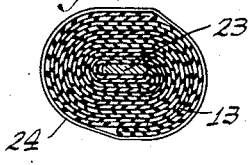
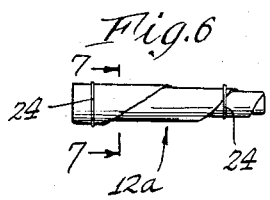
Inventor
Kenneth P. Bagnall
By
Johnson and Kline
Attorneys Dec. 22, 1959 K. P. BAGNALL 2,918,030
SHIP SALVAGE APPARATUS
Filed Feb. 28, 1957 2 Sheets-Sheet 2
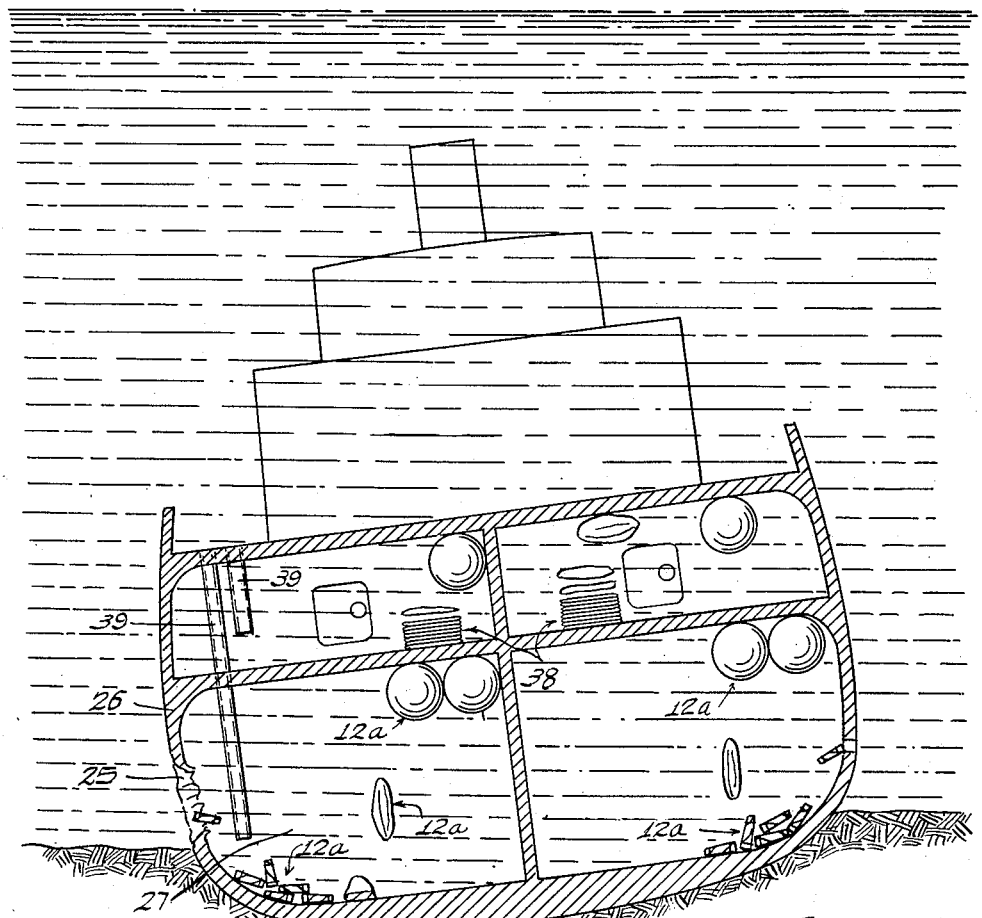
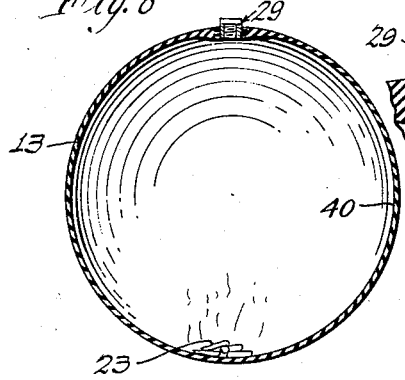
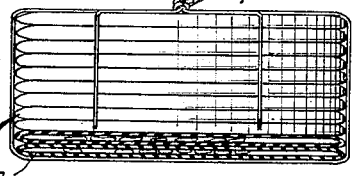
Inventor
Kenneth P. Bagnall
By
Johnson and Kline
Attorneys United States Patent Office 2,918,030
Patented Dec. 22, 1959

2,918,030

SHIP SALVAGE APPARATUS

Kenneth P. Bagnall, Fairfield, Conn.

Application February 28, 1957, Serial No. 643,150

2 Claims. (Cl. 114—54)

The present invention relates to an apparatus for salvaging sunken craft and/or cargo and, more particularly, to a method and apparatus for providing sufficient buoyancy in a sunken craft to cause the same to rise to the surface of the water.

Heretofore, numerous methods and apparatus have been designed and utilized in attempts to raise sunken craft for the salvage value of the craft itself, or the cargo contained in the craft. One of these methods contemplated using the craft itself as a pressure vessel and forcing a gas under pressure into it to displace the water, thereby providing buoyancy. However, such was not found feasible because of the inability to make the sunken craft gas-tight. Another method contemplated usage of a plurality of sealed, rigid, hollow containers which were either forced down through a pipe into the holes of a sunken craft from a salvaging vessel or else were carried down by a chain from the salvaging vessel. Both of these methods have not proved successful because of the disadvantages of requiring a complicated connection both in and between the sunken craft and the salvaged vessel, and of maintaining this connection during the positioning of the containers in the sunken craft. In addition, the rigid containers were expensive to manufacture which rendered most salvaging operations economically impractical and were not capable of withstanding the water pressure in the lower depths at which sunken crafts were generally located.

An object of the present invention is to provide a buoyant device which does not require any external connections between the sunken craft and the salvaging vessel or within the sunken vessel itself to cause inflation of the buoyant device to provide buoyancy for the craft.

Another object of the present invention is to provide a buoyant device which is capable of being positioned in a sunken craft in a collapsed condition and which is self-inflating by reason of integrally carrying its own inflating media.

A further object of the present invention is to provide a self-inflating buoyant device of the above disclosed type which may be either fastened to a craft to be inflated by the sinking of the craft or which may be positioned in a sunken craft either singularly or in a bundle containing a plurality of the devices, and in which in both instances the submergence in the water causes the device to inflate.

In attaining the above objects, the buoyant device of the instant invention includes a fluid-tight, inflatable container or body which is formed of flexible material so that it may be collapsed into a small package by folding and/or rolling it. Integral with each buoyant device and positioned within the body is an inflating media for causing the body to unfold and be inflated to assume its normal shape. In one embodiment, the inflating media consists of a liqud under high pressure contained in a capsule. The capsule has a valve which is held closed by the folds of the body but which upon unfolding of the body enables the liquid to turn into a gas to provide the necessary inflating pressure.

In another embodiment of the invention, the inflating media is a solid which sublimes to form the inflating pressure and the solid may be carbon dioxide which is commonly referred to as Dry Ice. The Dry Ice is located inside the body and prevented from turning into a gas when the body is collapsed by maintaining the body and Dry Ice at a lower temperature than the sublimation temperature of the Dry Ice. Consequently when the device is submerged in the water and positioned in a sunken craft the water temperature will raise the temperature of the device above this temperature to provide for inflation and hence buoyancy.

A feature of the present invention resides in controlling the pressure of the gas inside the body so that there exists a differential pressure between the body pressure and the adjacent water pressure. This is accomplished, according to the present invention, by a safety valve which limits the valve of the body pressure to less than the bursting pressure of the walls of the body yet more than the inflating pressure.

Other features and advantages will hereinafter appear.

In the drawing:

Figure 1 is a view of a sunken craft carrying collapsed buoyant devices according to the present invention.

Fig. 2 is a view of the sunken craft after providing buoyancy by inflation of the devices which raises the craft to the water surface.

Fig. 3 is one embodiment of the buoyant device of the present invention shown in collapsed condition.

Fig. 4 is a view in section of the buoyant device of Fig. 3, partially inflated and in dotted lines, the completely inflated device.

Fig. 5 is an enlarged section taken on the line 5—5 of Fig. 3.

Fig. 6 is a view of another embodiment of the present invention in a collapsed condition.

Fig. 7 is an enlarged section taken on the line 7—7 of Fig. 6.

Fig. 8 is a section of the buoyant device of Figs. 6 and 7 in inflated condition.

Fig. 9 is a section of a sunken vessel with buoyant devices of the present invention located therein.

Fig. 10 is a bundle, partly in section of a plurality of buoyant devices.

Fig. 11 is an axial section of a relief valve incorporated in the device.

Referring to the drawing, there is shown a sunken craft in Figs. 1 and 2 which is generally indicated by the reference numeral 10. The craft 10 has compartments 11 within which are fastened buoyant devices 12 according to one form of the present invention. The buoyant devices 12 in Fig. 1 are shown in their collapsed condition while in Fig. 2 they are inflated to provide buoyancy to lift the craft to the surface of the water.

The buoyant device in its inflated condition is indicated in Fig. 4 in dotted lines and in the instant embodiment shown is a fluid-tight sphere though it is within the scope of the present invention to utilize other shapes, such as cylinders, cigar shapes, etc., and may be referred to as a balloon. The body 13 of the device 12 is flexible, somewhat resilient and approximately ¼ inch thick and is formed from either rubber or plastic materials which have the above characteristics. The body is capable of being folded and/or rolled into a compact shape such as shown in Fig. 3 without detrimental effect to the walls.

To cause the body to be inflated when it is submerged it carries integrally therewith its own inflating media. In the embodiment shown in Figs. 3, 4 and 5, there is carried within the body a capsule 14 which contains a gas, such as carbon dioxide or air under a pressure sufficient to maintain it as a liquid, and a quantity sufficient to inflate the body. The capsule 14 has an inlet 15 for enabling the charging of the capsule and an outlet opening 16 along a side thereof. A needle valve element 17 having a pointed conical end 18 mates with a conical seat 19 of the outlet opening to form the valve. The needle valve member 17 is carried by one end of a resilient offset plate 20, while the other end of the plate is attached to the capsule.

The folded condition of the body in Fig. 3 results from collapsing the body and folding it upon a diameter perpendicular to the direction in which the capsule extends. It is then folded along a radius parallel to the capsule, and rolled tight about the capsule. A plurality of string elements 21 are used to bind the body to maintain it in its collapsed form. In this collapsed condition, the body maintains the needle valve member and the seat of the outlet of the capsule closed to prevent inflation of the body. The valve member normally tends to be held at an open position by the plate 20 carrying the valve member 17 normally assuming this position, however the folded body is used to maintain the valve closed until it is desired to inflate the body.

As shown in Figs. 1 to 4 inclusive, the collapsed and rolled body has a link or chain 22 which anchors the body to a bulkhead of the craft 10. The other end of the body is preferably fastened by use of one of its binding strings 21, though other well-known apparatus may be used to anchor the device to the craft. The strings 21 in this form of the invention are of the type which weaken and/or deteriorate when submerged in water for example, cotton cord impregnated with caustic soda. Accordingly when a craft has sunk, such as shown in Fig. 1, the water deteriorates the binding strings 21 which enables the body to partially unroll to cause opening of the valve. This permits the inflating media to escape from the capsule into the interior of the body to cause inflation of the body and hence buoyancy for the sunken craft. As shown in Fig. 2, a plurality of devices 12 are sufficient to raise the craft to the surface of the water where it may be towed to a drydock.

As shown in Figs. 6 to 10 inclusive, the device 12a in this embodiment, differs from the previous embodiment in that rather than having the inflating media carried by a capsule it consists of a piece or pieces of solid material 23 which sublimes, such as Dry Ice, positioned within the body. The Dry Ice is inserted into the body while the latter is collapsed and after insertion the device is maintained at a temperature which prevents sublimation of the Dry Ice, for example minus 100 degrees F. In order to keep the device folded, a pair of rubber bands 24 or other restraining elements are utilized.

As shown in Fig. 9 the devices are positioned within the sunken craft while they are in the collapsed condition by a diver (not shown) placing them through a gash 25 in the bulkhead 26 of the craft so that they fall into a compartment 27 or they may be inserted through portholes, not shown, or compartmentways of the various compartments. The diver may receive them from the salvaging ship by taking them down with him or they may be guided from the salvaging ship to him. Moreover, since the devices when collapsed will sink, they may be guided directly from a salvaging ship (not shown) into the sunken craft by a tube or other guiding means.

It will be appreciated that in the above set forth method the devices remain collapsed until the temperature of the water increases the temperature of the body and the Dry Ice above the sublimation temperature. The raising of the temperature of the device requires a certain amount of time and hence the device does not inflate immediately upon being submerged in the water. Thus there is provided sufficient time in which the device stays collapsed for it to be positioned in the sunken craft. Then as the Dry Ice sublimes the body is slowly inflated to the shape shown in Fig. 8.

As shown in Figs. 8 and 11 there is provided a relief valve 29 for maintaining a substantially constant differential pressure between the body pressure and the adjacent water pressure. Thus the body wall is required to be capable of withstanding only the differential pressure and not the water pressure which permits use of the device at exceeding depths. As shown in Fig. 11, there is molded in the wall of the body a threaded annular coupling 28 into which the relief valve 29 is threaded. The valve consists of a plug 30 having an opening 31 at its bottom end and openings 32 at its top so that escaping gas can flow from the interior of the body through the bottom opening 31 and out through the top openings 32. To control the flow, there is provided a plunger 33 having a resilient valve seat 34 which engages the end of the bottom opening 31 to form the closure for the valve. A spring 35 encircles the plunger to maintain the valve seat in engagement with the end of the opening 31 and the value of the spring may be varied to vary the value of the differential pressure. Accordingly, as the device rises from a lower depth to a higher depth, or if the Dry Ice creates too much of a pressure within the body, the valve will open permitting the excess pressure to escape. The valve 29 may be removed from the coupling 28 to permit insertion of the Dry Ice.

While the devices in the previous embodiment have been shown as being individual, they may be folded individually and then packaged together as shown in Fig. 10 wherein a plurality of devices generally indicated by the reference numeral 36 are constrained by a binding cord 37 so that they may be easily handled.

As shown in Fig. 9, the craft 10 is shown sunk. However, the present invention in addition to the raising of sunken craft also contemplates the prevention of the craft from sinking. This is accomplished by positioning in compartments of the craft, that are being flooded, collapsed buoyant devices 12 or 12a (only 12a being shown in Fig. 9) which upon submergence in the flooding compartment inflate to create buoyancy thereby preventing the craft from sinking. To this end the craft contains a plurality of tubes 39 which lead from the top deck into the various compartments with one tube for each compartment. Accordingly, when a gash, for example, causes the flooding of a compartment then buoyant devices may be dropped or forced down the tube 39 into the flooded compartment without requiring entrance into the compartment. The devices 12 or 12a may be either carried by the craft or else they may be kept at various strategically located warehouses to be flown to crafts that are flooding.

It will be appreciated that the pressure created by the devices beginning to inflate will break the binding cord so as to leave a stack of devices as indicated by reference numeral 38 within a compartment and these devices will self-inflate to provide buoyancy. Since the walls of the body are flexible and relatively thin they are subject to being punctured by sharp objects and to obviate such occurrence a thin coating of a self-sealing compound may be formed on the interior surface of the balloon as indicated by reference numeral 40 in Fig. 8. This compound is the same material used in punctureproof tires.

Though, of course, the size of the balloon may vary depending upon various factors such as cost, ease of handling, compartment size, etc., it is presently preferred to form each balloon so that it has a buoyant lift of about 1000 pounds.

It will be appreciated that there has been set forth heretofore, a salvaging device, and method of using the same, which is positioned within a sunken craft in a collapsed condition and is self-inflating to provide a buoyant lift to the craft. The device has integrally carried therewith its own inflating media which inflates the body after submergence in water. In addition, the device is economical to manufacture which renders the use of a large number of them in salvage operation economically feasible.

Variations and modifications may be made within the scope of the claims and portions of the improvements may be used without others.

I claim:

1. A device for providing buoyancy in a craft by displacing water contained in the craft comprising an inflatable balloon formed of flexible material and normally being in collapsed, folded condition; means containing a fluid under pressure for inflating the balloon and including a valve maintained closed by the folded balloon; and an element maintaining the balloon in folded condition and being deteriorated by submergence in water, whereby upon sinking of the craft, the element deteriorates enabling the balloon to unfold which opens the valve to inflate the balloon and provide buoyancy for the craft.

2. The invention as defined in claim 1 in which the balloon is provided with a link for anchoring it to the craft.

References Cited in the file of this patent

UNITED STATES PATENTS

| | | |
|---|---|---|
| 357,657 | Dodman | Feb. 15, 1887 |
| 557,396 | Kindt | Mar. 31, 1896 |
| 719,654 | Ewing | Feb. 3, 1903 |
| 1,014,546 | Wich | Jan. 9, 1912 |
| 1,255,512 | Clements | Feb. 5, 1918 |
| 1,303,910 | Johnson | May 20, 1919 |
| 1,320,012 | Lee et al. | Oct. 28, 1919 |
| 1,621,458 | Campbell | Mar. 15, 1927 |
| 1,772,709 | Culbertson | Aug. 12, 1930 |
| 2,320,111 | Ware | May 25, 1943 |
| 2,701,886 | Ivie | Feb. 15, 1955 |
| 2,711,868 | Parker et al. | June 28, 1955 |
| 2,768,601 | Davis | Oct. 30, 1956 |